G. L. SMITH.
COLLAPSIBLE TOP FRAME FOR VEHICLES.
APPLICATION FILED JUNE 15, 1920.

1,390,220.

Patented Sept. 6, 1921.

George L. Smith,
Inventor

UNITED STATES PATENT OFFICE.

GEORGE L. SMITH, OF WASHINGTON, DISTRICT OF COLUMBIA.

COLLAPSIBLE TOP-FRAME FOR VEHICLES.

1,390,220.  Specification of Letters Patent.   Patented Sept. 6, 1921.

Application filed June 15, 1920. Serial No. 389,070.

*To all whom it may concern:*

Be it known that I, GEORGE L. SMITH, a citizen of the United States, residing at Washington, in the District of Columbia, have invented certain new and useful Improvements in Collapsible Top-Frames for Vehicles; and I do hereby declare the following to be a full, clear, and exact description of the invention, such as will enable those skilled in the art to which it pertains to make and use the same.

My invention relates to collapsible top frames for vehicles and particularly to the construction of the rear portion of such top frames.

It is my purpose to provide a collapsible frame in combination with a rear wind and dust shield which can be manipulated with relative ease to or from the elevated position; which will combine strength with simplicity of construction, with corresponding advantages of durability and economy of manufacture; which will facilitate the attachment of all curtains from the inside of the vehicle; which will afford a clear view to the rear by the use of glass windows of large size in the rear wind and dust shield and which will permit the use of two lowered positions, one in which the folded top frame assumes a position approximately horizontal and the other in which it assumes an inclined position. In addition to the foregoing, it is also my purpose to provide a more graceful outline or silhouette and to reduce wind resistance and eddy currents at the rear by a downward slant or incline of the top covering from its highest point to its rear end, while maintaining ample head room abreast the rear doors to facilitate entering and leaving the tonneau.

I will describe my invention in the best form known to me at present and as applied to an automobile of standard type, but it will be understood that the same is applicable to other types of automobiles and vehicles and that it is susceptible to changes in form and proportions and to desirable additions with the exercise of only ordinary mechanical skill and without departing from the spirit of the invention.

In describing my invention in detail, I will refer to the accompanying drawing wherein like characters of reference denote corresponding parts in the different views and in which—

Figure 1:
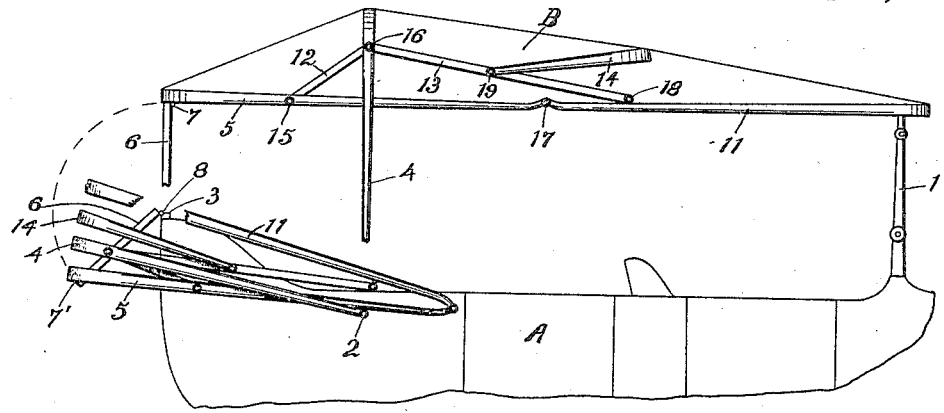
Figure 1 is a side view of my improved top frame shown in elevated and low collapsed positions.

Referring now to the drawing, A indicates a partial view of the vehicle body and B the top frame in elevated position. The numeral 1 indicates a windshield of the usual type which acts as a support for the front end of the top frame and 2 the usual pivot bearings at the side of the vehicle body. 3 is the upper rear edge of the vehicle body to which the wind and dust shield 6 is pivoted by means of a hinge 8. I can, however, mount this shield rigidly upon the rear part of the vehicle body should I desire to dispense with the low collapsed position of the top. The shield 6 is composed of a rectangular frame containing a plate glass panel 10, or, if I so desire, I can insert a panel of opaque material containing one or more glass windows of smaller size than the glass 10. The shield 6 and the rear bow 5 are pivoted together by the hinge 7. The upper portion of the top frame for the support of the top covering is constructed along the lines indicated in my application Serial No. 350964 dated January 12, 1920, and consists of a supporting bow 4, a cover frame composed of opposed bows 5 and 11 pivotally connected at 17, links 12 and 13 connected to the supporting bow 4 at the pivot 16 and to the two bows 5 and 11 of the cover frame at the points 15 and 18 respectively and the necessary auxiliary bows pivotally connected to the links.

Figure 2:
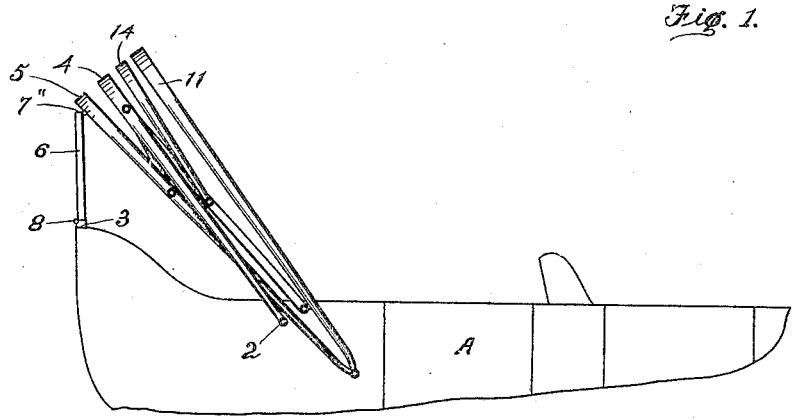
Fig. 2 is a side view of same shown in intermediate collapsed position.
Figure 3:
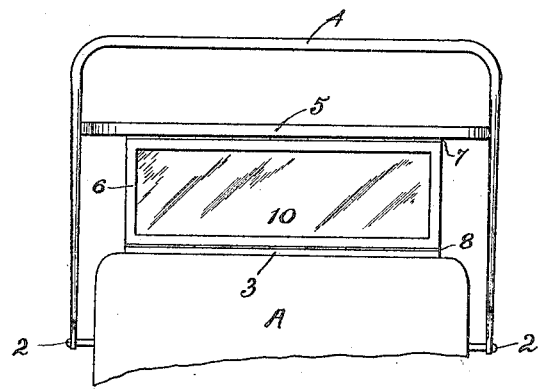
Fig. 3 is a rear view showing wind and dust shield.

The top frame collapses in either one of two positions as shown in Figs. 1 and 2. In Fig. 1 the shield 6 is swung downwardly and rearwardly to a fixed position determined by the triangle formed by the pivot points 2, 8, and 7' and when the top bows are secured in collapsed position by the usual strap or other securing means generally provided, the shield 6 acts as a support for the top frame since any elongation or reduction of the side 2, 7' of the aforesaid triangle is prevented through the medium of the link 12 connecting bows 4 and 5, hence the position of the pivot 7' must remain fixed with respect to the vehicle body.

In Fig. 2 the shield 6 supports the top frame in an intermediate position if the shield is not allowed to swing downwardly and rearwardly when the top frame is collapsed, since in this position the pivot points 2, 8 and 7'' form a triangle which is of the same dimensions as the triangle 2, 8, 7' but reversed in position, the pivot 7'' being above the line joining the pivots 2 and 8.

From the foregoing description, it will be seen that the peculiar construction of my top frame permits the pivoting of the shield to it so that the rear bow 5 is constrained to move around the pivot point 8 on the vehicle body when the top is raised or lowered, and, while I prefer to use a shield as shown in the views, two or more connecting bars or rods pivoted at the points 7 and 8 will effect the same result, in which case the usual type of leather or cloth rear curtain can be employed with window lights inserted in it.

I claim:—

1. The combination with a vehicle body of a collapsible top frame pivotally connected thereto and means pivotally connected to the back of the vehicle body and to the top frame co-acting with the pivotal connection between the vehicle body and the top frame for supporting the latter in erected position and in a plurality of collapsed positions.

2. The combination with a vehicle body of a collapsible top frame pivotally connected thereto and including a rear bow and means, pivotally connected to the rear bow and the back of the vehicle body, maintaining the transverse portion of the rear bow at a fixed distance from the pivotal connection of said means to the vehicle body during the movement of raising and lowering the top frame.

3. The combination with a vehicle body of a collapsible top frame pivotally connected thereto and including a rear bow and a shield pivotally connected at its upper edge to the rear bow and at its lower edge to the back of the vehicle body.

4. A collapsible top frame including a supporting bow adapted to be pivotally connected to a vehicle body, a rear bow the arms of which extend without connection between the arms of the supporting bow, a link pivotally connected to the supporting bow and to the rear bow at a point spaced from the ends thereof and a shield pivotally connected to the rear bow and adapted to be pivotally connected to the back of the vehicle body.

5. The combination with a vehicle body of a collapsible top frame including a supporting bow pivotally connected thereto, a rear bow extending loosely between the arms of the supporting bow, a forwardly extending bow pivotally connected to the rear bow, a link pivotally connected to the supporting bow and to the rear bow at a point spaced from the ends thereof, a link pivotally connected to the supporting bow and to the forwardly extending bow at a point spaced from the ends thereof and means movably connecting the rear bow to the rear portion of the vehicle body.

6. The combination with a vehicle body of a collapsible top frame including a supporting bow pivotally connected thereto, a rear bow extending loosely between the arms of the supporting bow, a forwardly extending bow pivotally connected to the rear bow, a link pivotally connected to the supporting bow and to the rear bow a link pivotally connected to the supporting bow and to the forwardly extending bow and a shield pivotally connected to the rear bow and the vehicle body.

7. The combination with a vehicle body of a collapsible top frame including a supporting bow pivotally connected thereto, a rear bow extending loosely between the arms of the supporting bow, a front bow pivotally connected to the rear bow, a link pivotally connected to the supporting bow and to the rear bow at a point spaced from the ends thereof, a link pivotally connected to the supporting bow and to the front bow at a point spaced from the ends thereof and a shield pivotally connected to the rear bow and the rear portion of the vehicle body.

8. The combination with a vehicle body of a collapsible top frame comprising a supporting bow, a cover frame extending loosely between the arms of the supporting bow and composed of a plurality of pivotally connected bows, a plurality of opposed connecting members on either side of the top frame pivotally connected to the supporting bow at a point above the cover frame when in erected position and to the arms of the cover frame bows at points spaced from their pivotal connections and means movably connecting the supporting bow and the cover frame to the vehicle body.

9. The combination with a vehicle body of a collapsible top frame comprising a supporting bow pivotally connected thereto, a cover frame extending loosely between the arms of the supporting bow and composed of a plurality of pivotally connected bows, a plurality of opposed connecting members on either side of the top frame pivotally connected to the supporting bow at a point above the cover frame when in erected position and to the arms of the cover frame bows at points spaced from their pivotal connections and means connecting the rear portion of the cover frame to the vehicle body.

10. A vehicle top frame including a supporting bow, a rear bow extending substantially in a horizontal direction across the arms of the supporting bow, a forwardly extending bow pivotally connected to the rear bow, a link pivotally connected to the supporting bow and to the arms of the rear bow and a link pivotally connected to the supporting bow and to the arms of the forwardly extending bow, the pivotal connection of said links to the supporting bow being disposed above the arms of the rear bow.

In testimony whereof I affix my signature in the presence of two witnesses.

GEORGE L. SMITH.

Witnesses:
 HENRY T. BRIGHT,
 FLORENCE A. BLINN.